US006880574B1

(12) United States Patent
Porto

(10) Patent No.: US 6,880,574 B1
(45) Date of Patent: Apr. 19, 2005

(54) AUTOMATED WATER DISABLING VALVE FOR AN APPLIANCE

(76) Inventor: Lou Porto, P.O. Box 354, Walnut, CA (US) 91788

( * ) Notice: Subject to any disclaimer, the term of this patent is extended or adjusted under 35 U.S.C. 154(b) by 0 days.

(21) Appl. No.: 10/799,222

(22) Filed: Mar. 12, 2004

Related U.S. Application Data
(60) Provisional application No. 60/466,899, filed on May 1, 2003.

(51) Int. Cl.[7] ............................................. F16K 31/12
(52) U.S. Cl. ................ 137/624.11; 137/486; 137/487.5
(58) Field of Search ....................... 137/624.11, 624.12, 137/486, 487.5

(56) References Cited

U.S. PATENT DOCUMENTS

| | | | | |
|---|---|---|---|---|
| 4,581,944 A | * | 4/1986 | Obermann et al. ...... | 73/861.47 |
| 5,038,820 A | * | 8/1991 | Ames et al. ........... | 137/624.12 |
| 5,139,044 A | * | 8/1992 | Otten et al. .................... | 137/80 |
| 5,287,884 A | * | 2/1994 | Cohen ................... | 137/624.12 |
| 5,771,920 A | * | 6/1998 | Jewett et al. ............. | 137/487.5 |
| 5,782,263 A | * | 7/1998 | Isaacson et al. .......... | 137/487.5 |

* cited by examiner

Primary Examiner—Kevin Lee
(74) Attorney, Agent, or Firm—Kenneth L. Tolar

(57) ABSTRACT

An automated water control valve for disabling water flow to an appliance includes a shell having a water inlet and a water outlet. A solenoid valve selectively disables water flow through the device. A sensing channel includes a spring-biased magnet that migrates towards a Hall effect device in the event that water pressure at the outlet is less than the inlet water pressure, i.e., such as when water is flowing to the appliance. The magnet becomes substantially aligned with the Hall effect device which in turns instructs a microprocessor to open the solenoid valve. When the appliance is properly operating and water flow thereto is disabled, pressure at the outlet will equalize with that of the inlet allowing the magnet to return to its original position thereby instructing the microprocessor to close the solenoid valve. In the event that the microprocessor does not receive the requisite control signal, i.e., the appliance or supply line is malfunctioning and resulting in continuous water flow, a timer will close the solenoid valve upon the expiration of a predetermined duration.

3 Claims, 2 Drawing Sheets

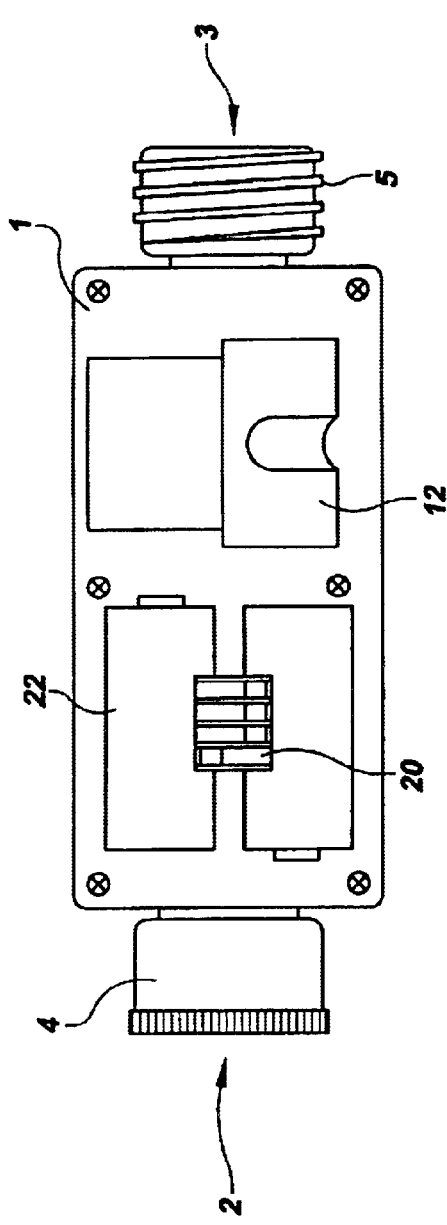
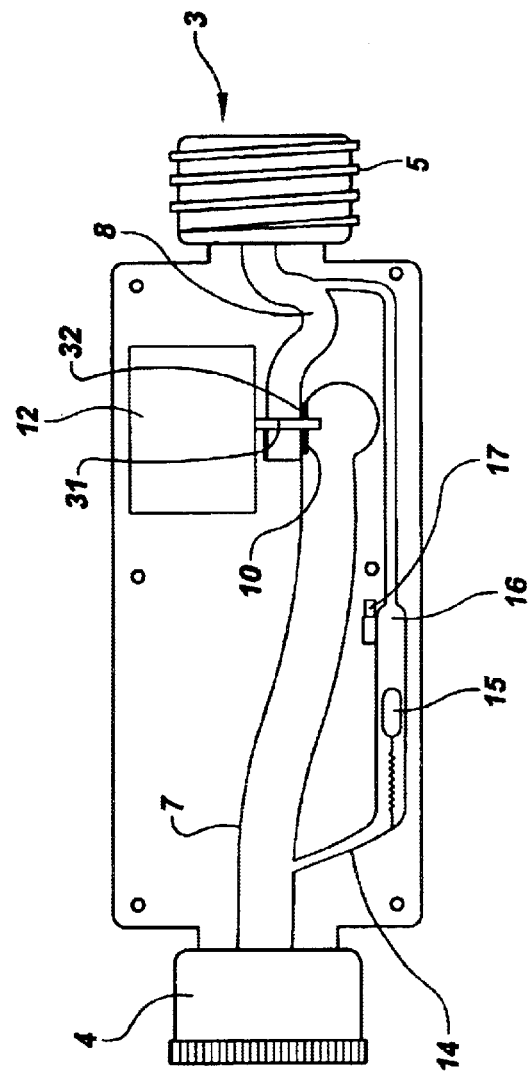
FIG.1
FIG.2

AUTOMATED WATER DISABLING VALVE FOR AN APPLIANCE

CROSS REFERENCE TO RELATED APPLICATIONS

According to 35 U.S.C. Section 119(e), this application is entitled to the benefit of provisional application No. 60/466,899 filed on May 1, 2003.

BACKGROUND OF THE INVENTION

1. Technical Field of the Invention

The present invention relates to an automated valve for an appliance that disables water flow thereto in the event of appliance or water supply line failure.

2. Description of the Prior Art

Many appliances such as water heaters, dishwashers, washing machines, ice makers and toilets are connected to a water supply line. The appliance also typically includes a level sensor, timer switch or other control device that toggles a supply valve to intermittently deliver fresh water when needed. Inevitably, the appliance, or water supply line therefor, will fail resulting in continuous, unrestrained water flow until a user discovers the problem and disables a primary supply valve. As a result, the failure can result in significant water damage to a dwelling. Accordingly, there is currently a need for a device that automatically disables the water supply to an appliance in the event of an aforementioned malfunction.

The present invention satisfies the above described need by providing an automated control valve that is installed on a water supply line upstream from an appliance. The valve includes means for detecting appliance or supply line failure and for automatically disabling water flow in response thereto.

SUMMARY OF THE INVENTION

The present invention relates to a water flow disabling valve for an appliance including a substantially hollow shell having an inlet and an outlet. Preferably, the inlet includes a female pipe thread connector while the outlet includes a male pipe thread connector for easily coupling the device with a water supply pipe. A water conduit within the shell extends from the inlet to the outlet. The water conduit includes a solenoid operable valve for selectively disabling flow therethrough. The solenoid operated valve is electrically connected to a microprocessor that instructs the valve to open and close.

A sensing channel is in fluid communication with the water conduit for detecting the pressure differential between the inlet and outlet. Received within the sensing channel is a spring-biased, plastic-coated magnet that selectively seats within a throat to disable flow through the channel. A Hall effect device is positioned exteriorly of the sensing channel at a position adjacent the throat.

When a given appliance requests feed water, pressure on the outlet side of the sensing channel decreases rapidly thereby moving the magnet toward the Hall effect device and into the throat to disable flow through the sensing channel. Simultaneously, the magnet actuates the Hall effect device, which signals the microprocessor to open the solenoid valve and start a timer. When the downstream appliance water control means disables water flow, pressure on the outlet end of the sensing channel will begin increasing until equalized with that of the inlet end. Accordingly, the spring-biased magnet will gradually migrate to its original position whereby the Hall effect device transmits an instructional signal to the microprocessor that the appliance is operating normally. If the downstream water supply line or appliance fails, the magnet remains seated within the throat; accordingly, the microprocessor would not receive the requisite signal whereby the timer closes the solenoid valve after a predetermined duration.

It is therefore an object of the present invention to provide a water flow disabling device that minimizes water damage caused by a malfunctioning appliance or broken water supply line.

It is another object of the present invention to provide a device that automatically disables water flow to an appliance in the event of appliance or water supply line failure.

It is yet another object of the present invention to provide a water flow disabling device that is inexpensive to manufacture and operate.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a top, cross-sectional view of the device.

FIG. 2 is a side, cross-sectional view of the device.

DESCRIPTION OF THE PREFERRED EMBODIMENT

Figure 3:
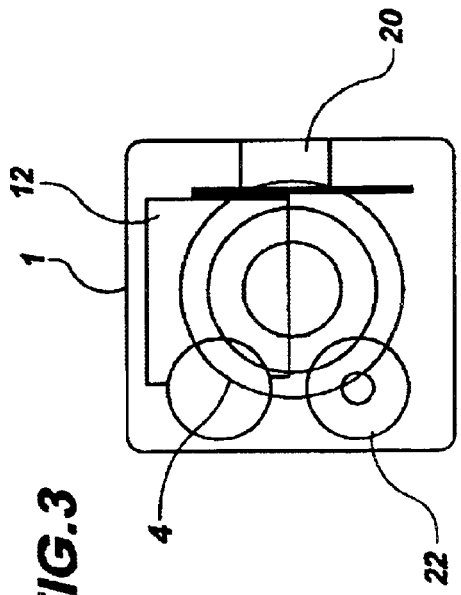
FIG. 3 is an end view of the device.
Figure 4:
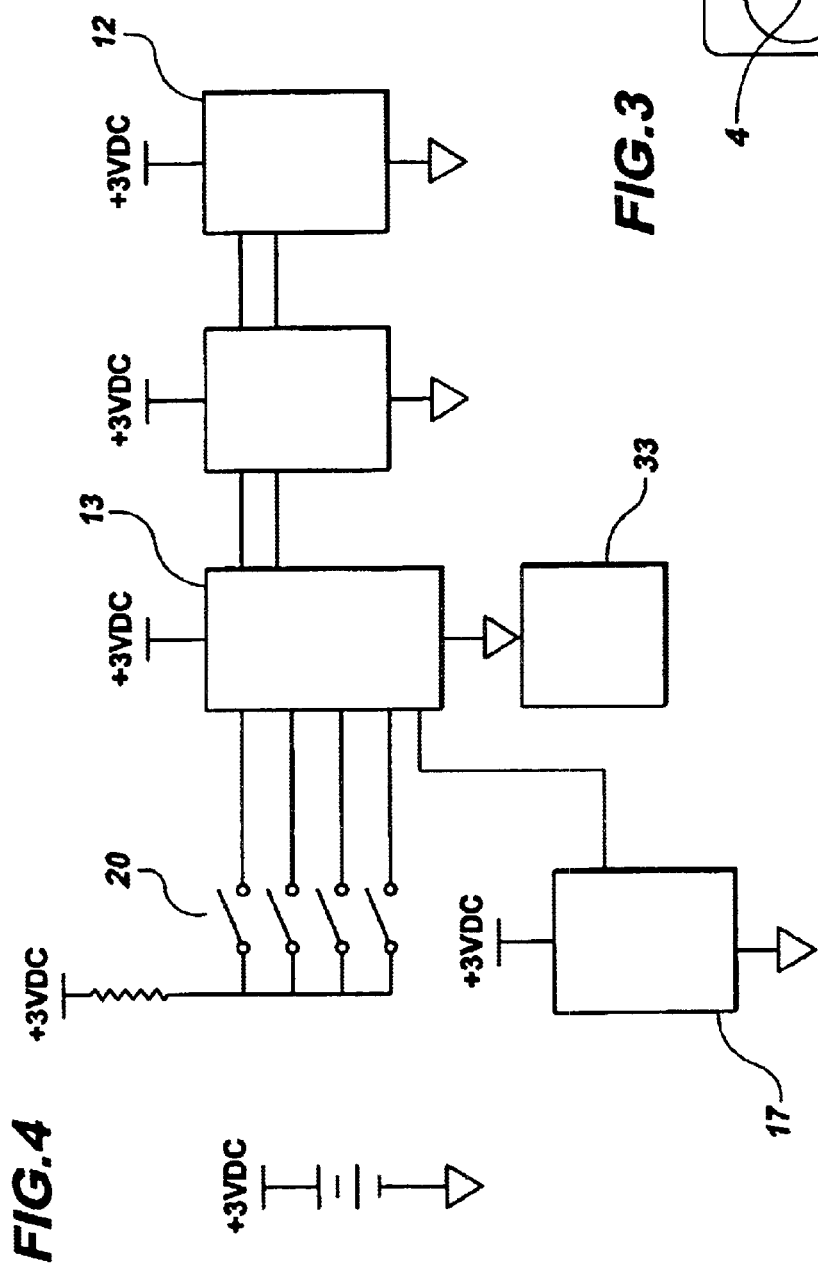
FIG. 4 is a block diagram of the various electrical components according to the present invention.

The present invention relates to a water flow disabling valve for an appliance including a substantially hollow shell 1 having an inlet 2 and an outlet 3. Preferably, the inlet includes a female pipe thread connector 4 while the outlet includes a male pipe thread connector 5 for easily coupling the device with a water supply pipe. An inlet water conduit 7 extends from the inlet to an outlet fluid conduit 8 that terminates at the outlet. The inlet and outlet fluid conduits intersect at a valve seat 10 that establishes fluid communication therebetween.

A solenoid operable valve 12 includes a retractable pin 31 with a plunger 32 at a distal end. The plunger is movable into and out of the seat for selectively disabling flow through the conduits. The solenoid operated valve is electrically connected to a microprocessor 13 having an integral timer 33 that instructs the valve to open and close. The timer duration can be selected with a binary DIP switch 20 on the exterior surface of the shell.

A sensing channel 14 is in fluid communication with both the inlet and outlet fluid conduits for detecting the pressure differential therebetween. Received within the sensing channel is a spring-biased, plastic coated magnet 15 that selectively seats within a throat 16 to disable flow through the channel. A Hall effect device 17 is positioned exteriorly of the sensing channel at a position adjacent the throat.

When a given appliance requests feed water, pressure on the outlet end of the throat decreases rapidly thereby moving the magnet toward the HALL effect device. The magnet then is positioned within the throat to disable flow through the sensing channel. Simultaneously, the Hall effect device signals the microprocessor to open the solenoid valve and start a timer. When the downstream appliance water control means (i.e. timer, level control valve, etc.) disables water flow, pressure on the outlet end of the sensing channel will begin increasing until equalized with that of the inlet end. Accordingly, the spring-biased magnet will gradually migrate to its original position thereby transmitting an instructional signal to the microprocessor that the appliance is operating normally; the microprocessor then closes the solenoid valve. If the downstream water supply line or appliance fails, the magnet remains within the throat; accordingly, the microprocessor does not receive the requisite signal whereby the timer closes the solenoid valve after a predetermined duration.

The above described device is preferably operated with batteries 22; furthermore, if the batteries become depleted, the microprocessor automatically closes the solenoid valve until the batteries are replaced.

The above described device is not limited to the exact details of construction and enumeration of parts set forth above. Furthermore, the size, shape and details of construction can be varied as desired.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with an appliance having a water supply line, an automated water disabling valve comprising:
   a hollow shell in fluid communication with said water supply line, said shell having an inlet, an outlet and a conduit extending therebetween;
   a sensing means for determining if water is flowing through said shell, said sensing means including a channel extending from a first position on said conduit proximal said inlet to a second position adjacent said outlet, said channel including a throat therein, said sensing means further including a spring-biased magnet received within said channel and a Hall effect device positioned exteriorly of said channel and proximal the throat whereby water flow through said conduit results in a pressure drop within said channel forcing said magnet into said throat to disable flow therethrough while simultaneously actuating said Hall effect device indicating that water flow to said appliance is occurring;
   a disabling means in communication with said sensing means for disabling water flow through said shell if water flow through said shell continues beyond a predetermined duration.

2. The valve according to claim 1 wherein said disabling means includes:
   a valve positioned within said conduit for selectively disabling flow therethrough;
   a microprocessor means connected to said valve and said Hall effect device;
   a timer means integral with said microprocessor means for transmitting an instructional signal to said microprocessor means upon expiration of a predetermined duration whereby upon said sensing means detecting water flow through said conduit after expiration of the predetermined duration, a signal is transmitted to said microprocessor means which immediately closes said valve to disable water flow through said conduit.

3. The valve according to claim 1 wherein said shell includes an exterior surface with a switch means thereon for selectively adjusting the predetermined duration.

* * * * *